US008334326B2

(12) United States Patent
Feichtinger et al.

(10) Patent No.: US 8,334,326 B2
(45) Date of Patent: Dec. 18, 2012

(54) NEUTRALIZATION BY FILLER

(75) Inventors: Klaus Feichtinger, Linz (AT); Manfred Hackl, Linz-Urfahr (AT); Gerhard Wendelin, Linz (CH)

(73) Assignee: Erema Engineering Recycling Maschinen und Anlagen Gesellschaft m.b.H., Ansfelden (AT)

( * ) Notice: Subject to any disclaimer, the term of this patent is extended or adjusted under 35 U.S.C. 154(b) by 0 days.

(21) Appl. No.: 13/260,966

(22) PCT Filed: Mar. 30, 2010

(86) PCT No.: PCT/AT2010/000092
§ 371 (c)(1),
(2), (4) Date: Nov. 29, 2011

(87) PCT Pub. No.: WO2010/111724
PCT Pub. Date: Oct. 7, 2010

(65) Prior Publication Data
US 2012/0071573 A1    Mar. 22, 2012

(30) Foreign Application Priority Data

Mar. 30, 2009  (AT) ................... A 504/2009

(51) Int. Cl.
C08J 11/04  (2006.01)
C08J 9/00   (2006.01)
(52) U.S. Cl. ........................... 521/46; 521/40.5; 521/47
(58) Field of Classification Search ............... 521/40.5, 521/46, 47
See application file for complete search history.

(56) References Cited

FOREIGN PATENT DOCUMENTS
EP    1 849 822 A1    10/2007

Primary Examiner — Terressa Boykin
(74) Attorney, Agent, or Firm — Kilpatrick Townsend & Stockton LLP

(57) ABSTRACT

The invention relates to a method for adjusting the pH value and/or for neutralizing acid and/or basic compounds, in particular degradation or decomposition products, as part of the reprocessing and recycling of in particular thermoplastic materials, in the course of which the polymer particles are permanently moved and heated in a reactor, wherein at least one filler is added for neutralization purposes, specifically in a quantity which corresponds at least to the anticipated acid or alkali load.

14 Claims, No Drawings

NEUTRALIZATION BY FILLER

CROSS-REFERENCES TO RELATED APPLICATIONS

This application is a National Stage of International Application No. PCT/AT2010/000092 filed Mar. 30, 2010, and which claims the benefit of Austrian Patent Application No. A 504/2009, filed Mar. 30, 2009, the disclosures of which are incorporated herein by reference.

The present invention pertains to a method for adjusting the pH value and/or for neutralizing acidic and/or basic compounds, in particular degradation or decomposition products, as part of the reprocessing and recycling, in particular of thermoplastic materials.

In the process of manufacturing or compounding plastics, various additives or aggregates are often used. The purpose of these additives is to adjust the material characteristics to the requirements of the application in question and to improve the chemical, electrical and mechanical properties. Among such additives or aggregates are softeners, stabilizers, dyes, reinforcing agents, and also fillers.

As a general rule, and also in this text, the term fillers is understood to mean agents which are added to plastics to increase their volume and/or their weight. Normally, fillers are added in fairly large quantities or percent by weight. Thus, fillers are primarily the classical extenders which form a fairly considerable constituent of the end product, and which reduces the cost of manufacturing plastics. In addition, active fillers improve the mechanical properties of the material. Sometimes fillers are also called filling compounds, extension agents or extenders.

The term of classical fillers also implies certain characteristics of the added agents itself. Thus a classical filler is generally speaking in powder form, relatively inert, relatively cheap and readily available.

In the plastic processing industry an understanding has been developed as to what is usually called a filler. Liquids, reactive agents, etc. are definitely not called fillers in the industry.

Common fillers include chalk, sand, kieselguhr, glass fibres, zinc oxide, quartz, saw dust, starch, graphite, soot, talcum and carbonate, in particular calcium carbonate.

Numerous plastics or polymers are known in prior art which contain a filler such as an inert mineral powder. Numerous processes are also known with which fillers can be added to a polymer. For example, fillers can be added in a plastic melt. Another possibility is a "cold mix" where the plastic and the fillers are mixed at low temperatures, and the mix is then heated and fused together. Furthermore it has been described, as for example in EP 1401623, that polymer material is first brought into a softened condition before the fillers are added.

The objective of all these processes is to ensure that the classical filler can be as effective as possible, for example by being evenly distributed in the polymer. In this manner, the optimal filling or extending effect can be achieved. Typically, about 20% to 60% by weight of filler can be added to a polymer material, leading to a lower cost of the end product.

However, there is one problem in the processing, reprocessing and recycling of plastics, which is exacerbated by the large quantities of added auxiliary and aggregate material. Usually the raw plastic material is first heated in the course of reprocessing until it finally melts and can be processed or extruded. The problem is that with recycling it is the rule that the plastics are not in pure form but in "compounded" form, and that the plastics are "contaminated" by the above named aggregates, but also by other substances.

Such external "contamination", i.e. substances that have been added deliberately to the polymer or which adhere to the polymer unintentionally, in particular after it has been used, can be organic or inorganic substances. Especially worth mentioning are adhesives such as acrylates or vinyl acetates, but also printer ink such as dyes or pigments which are used for printing on polymer foil, and also organic contaminants due to food residue, etc. All these external contaminants are usually thermally sensitive and decompose at higher temperatures, i.e. during heating or melting.

But plastics themselves can also be sensitive, for example to oxidation and radiation such as light or heat. These factors can lead to the decomposition of the polymer chains or to other degradation reactions. In particular it is known that some plastics are susceptible to being subjected to heat. Above a temperature that is characteristic for a certain material, e.g. the decomposition temperature, the molecular structure of the polymer chains begins to disintegrate. As a rule, an attempt is made to reduce all these "internal" reactions by adding stabilizers such as light stabilizers, heat stabilizers, flame retardants, etc. Stabilizers are chemically active and reactive substances which due to their reactivity interrupt disintegration mechanisms or their reaction speed. For example, heat stabilizers, especially organic barium, zinc, tin and cadmium compounds, or inorganic lead salts coordinate the sensitive double bonds of polymer chains and thus protect them against disintegration.

In practice, it is not always possible to adapt the process parameters, in particular the processing temperature, to the most sensitive component. Thus for example pigments, printer inks or colour bonding agents already decompose at about 120° C.;, while the processing temperature of most polymers almost always exceeds this, for example by more than 220° C. Most organic additives cannot withstand final extrusion, during which the material is molten under high pressure and at a high temperature, and they will decompose at that time if not earlier.

These processes, i.e. decomposition of external "contamination" as well as the internal degradation reaction of the plastic material itself, cause the formation of degradation and/or decomposition products. As is known, these products have a negative effect on the quality of the final product, interfere with the plastic matrix, lead to discoloration, the formation of bubbles or other material defects.

However, among these decomposition products are also compounds which have a basic or acidic effect, such as hydrochloric acid, nitric acid or acetic acid. Not only are these compounds detrimental to the quality of the final product itself, but they also present corrosion problems for the usually very expensive machines used in the reprocessing or recycling. This risk of corrosion exists in every stage of processing, beginning with the heating phase in the cutter compactor, but also in the downstream phases of the processing chain, such as in the extruder, namely especially where hot acid comes in contact with the metallic surfaces of the machines or machine parts. While final products which are of inferior quality and fail to meet specifications can still be disposed of relatively easily and without major costs, this is not the case with entire systems without stopping the whole production, and the replacement of parts is time-consuming and very expensive with such equipment.

It is therefore the object of the present invention to solve this problem and to extend the life expectancy of the equipment used in the recycling of plastics.

This object is achieved by the process according to claim 1.

The invention is based on the surprising realization that with the intentional addition of classical fillers in certain quantities, the pH value of a heated plastic mixture can be regulated, and the critical degradation or decomposition products can be neutralized. The functionality of classical fillers, namely the fact that fillers can be used for more than filling or extending polymers, has been hitherto unknown.

In various experiments it has been shown that the addition of classical fillers can effectively neutralize acidic and basic compounds, which leads to less corrosion and a longer life expectancy of machines. Various comparative experiments have led to the surprising result that with the inventive process corrosion is already clearly reduced after a relatively short time, and that metal parts in particular were far less affected by corrosion. The experiments also showed that the moving parts of machines such as the extruder screw or the mixer are subject to less wear and tear than would be the case otherwise.

The inventive process is particularly of practical interest since it is usually known to what extent the material to be recycled has been contaminated, for example whether the material consists of highly or slightly contaminated polymers or of polymers which will release large quantities of acidic or basic decomposition products. To neutralize decomposition products that can be are expected to be released or to form during a later temperature increase, it is now possible according to the invention to intentionally add a certain controlled quantity of a filler. In addition, this presents a very effective and low-cost measure, since the classical fillers are usually cheap, easily available and very effective due to their large surface. The cost of fillers used for such purposes is clearly lower than the cost to repair damage that would be caused by the corrosion of machine parts in the processing chain. Furthermore, classical fillers can be very easily integrated into the polymer with known methods and evenly distributed, and the fillers do not impair the properties of the material. Last but not least, the pH value of the entire course of reprocessing can be maintained most evenly in the neutral range; large fluctuations of the pH value are avoided throughout the reprocessing chain, which also increases the quality of the final product.

The inventive process will be described in more detail by means of advantageous embodiments in accordance with the sub claims.

Thus it is advantageous to use as filler a solid powdery, particularly a mineral material which is commonly used as an extender, such as chalk, sand, kieselguhr, glass fibres, zinc oxide, quartz, saw dust, starch, graphite, soot, talcum, activated carbon and preferably a carbonate, in particular calcium carbonate. Generally these fillers are easily available and therefore cheap, can be easily weighed and dosed, stored for long periods and are also an advantage for neutralization.

According to another version of the process it is advantageous to use a filler of medium grain size or a $D_{50}$ value of less than 50 µm, in particular between 2 and 15 µm and/or with a specific surface of 2 to 11 m²/g, in particular 5 to 9 m²/g. Such fillers are particularly effective, can be easily dispersed in polymer and optimally distributed, which ensures an even homogenous distribution in the polymer and an effective continuous neutralization.

It is also advantageous to provide a cheap filler that has not been surface-treated and is without any coating such as stearic acid.

According to another preferred embodiment of the process it is provided that the quantity or throughput of the added fillers is in the range of about 0.1 to 15 percent by weight, preferably between 1 and 10% by weight, whereby % by weight refers to the total weight of the polymer and filler mix. It has been found that as a rule, smaller quantities are adequate for neutralization than are customarily used to achieve the classical extending or filling effect.

It is also advantageous when the filler is added in powder form or in the form of a granulated concentrate bonded within a polymer matrix. In this manner, the filler can be well dosed, and the desired quantity can be added to the polymer in controlled doses.

An advantageous form of the process is characterized in that in a first step, the polymer material to be recycled is presented in a possibly evacuable receiving container with a mixing or comminuting arrangement, that subsequently at least some of the filler is added to the not yet heated polymer, and/or that at least some of the filler is added to the polymer that has been heated to a maximum temperature of 30° C. below its Vicat softening point (10 N).

In particular it is advantageous when at least some, preferably all of the filler is added to the polymer that has been heated to a temperature above 30° C. below its Vicat softening point (10 N), but still below the melting point, whereby the mixture—if appropriate under vacuum conditions≦mbar, permanently mixed for a certain dwell time in the cutter compactor, agitated, and if need be comminuted and held in chunky form.

In particular, it is advantageous when the entire quantity of filler is added to the softened but not yet molten polymer. In this manner, on the one hand, the filler can disperse very early in the polymer an form a homogenous mixture. On the other hand, the filler adheres to the softened surfaces of the polymer flakes as soon as the powder comes in contact with the polymer, which also ensures an effective distribution. A considerable part of the acidic and basic compounds is only formed at a higher temperature, especially during melting. But some additives decompose already during the reprocessing phase in the cutter compactor, especially organic dyes from printed surfaces. For that reason, it is an advantage when the filler is not added in the extruder, i.e. in the melt or immediately before, but if it is already all added in the beginning to counteract decomposition as early as possible and to neutralize the corresponding decomposition products in the very beginning. That way, the acids and bases are removed immediately after they are formed, and the pH value is maintained as evenly as possible in the neutral range throughout the whole course of reprocessing, thus avoiding strong fluctuations of the pH value along the reprocessing chain and increasing the overall quality of the material.

As mentioned, a considerable portion of the acids and bases if formed only at higher temperature in the extruder. Experience has shown that the addition of a filler in the intake area of the extruder is possible, but in that case the filler must be distributed in a relatively short time and yet evenly among the polymer in the interior of the extruder. It is advantageous if an already homogenous mix of polymer and filler is brought to the extruder to be melted there. In this manner, the neutralizing powder is distributed in the melting polymer even faster and better, and it is already in place when the temperature rises and more decomposition products, i.e. the acids and bases, are formed.

As a rule, the inventive process operates under normal pressure in a classical cutter compactor that is not necessarily evacuable and must not be built for vacuum use. That is normally the case with the less sensitive polymers such as PE, PP, etc.

However, with certain polymers, especially those that are sensitive to hydrolytical degradation and that may be hygroscopic such as polyesters, in particular PET, it is advantageous when the process is conducted such that means to reduce residual moisture and/or to prevent oxidization are employed.

Since the molecular structure of PET can be destroyed by certain factors, the following is therefore advantageous:

A first degradation mechanism is produced through the thermal degradation of the molecular chains. This destroys bonds between the individual molecules because of too much heat. For that reason, a certain dwell time and a suitable processing temperature must be observed to achieve a high-quality product.

A second and very relevant degradation mechanism is hydrolytical degradation, i.e. just as other polycondensates, PET is susceptible to water and moisture.

Water or moisture comes substantially from two sources: On the one hand, PET has a hygroscopic structure, i.e. PET absorbs moisture, which is incorporated in the intermolecular spaces, and it remains as so-called internal moisture in the polymer itself, that is to say in its interior. The internal moisture of original polymer depends on the ambient conditions. PET has a certain internal equilibrium moisture which is about 3000 ppm in the temperate zone.

Furthermore, there is additional moisture at the outer surface of polymer or polymer flakes (external moisture) which must be taken into account as well in processing.

If too much moisture—from whatever source—is present in processing or during the recycling or extrusion of PET, the polymer chains of PET are hydrolytically split, and in a chemical reaction some starting materials, namely terephthalic acid and ethylene glycol are formed again. This hydrolytical degradation in chain length of the molecules leads to a great loss of viscosity and to poorer mechanical properties in the final product or to detrimental changes in plastic properties. The damage can even be so severe that the material is no longer suitable for the processing of bottles, foil, etc.

Mainly at raised temperatures, polyester is especially susceptible to moisture, especially polymer melts at about 280° C. react extremely fast to water, and PET is degraded within seconds. To reprocess PET in recycling again, the material has to be provided with energy in the form of heat, especially during final extrusion.

Thus, to protect the polycondensate against hydrolytical degradation and to preserve the polymer chains, as much moisture as possible must be extracted from the material prior to reprocessing or before the temperature is increased too much, and care must be taken to properly control the temperature and the dwell time during processing.

If for example, damp PET is to be processed or reprocessed, and if this PET is brought into a cutter compactor, suitable measures must be taken to try and prevent hydrolytic damage to the polyester. To obtain a qualitatively appropriate final product, it is necessary in recycling or in the processing of sensitive polycondensates such as polyesters, to reduce as much as possible the internal moisture as well as the external moisture adhering to the surface of the plastic. Hydrolytical degradation can only be limited through appropriate drying, in particular under 100 ppm.

For this purpose, several technical processes are available. For example, it can be tried to remove the external moisture adhering to the plastic by producing a vacuum or by increasing the temperature.

However, in doing so, other technical problems must be taken into consideration. For example, amorphous and also partially crystalline PET has the tendency of sticking when heated, which also presents a great problem in practice. This problem can only be solved by continuous agitation.

Furthermore, it must be observed that some types of plastic are susceptible to oxidative degradation processes, which also shorten the chain length of the plastic molecules, and this can lead to other detrimental changes in the properties of the plastics, such as colour, strength, etc. To prevent this oxidative degradation in turn, it is possible to treat such sensitive plastics under exclusion of air, for example under an inert gas atmosphere.

The efficient and economic reprocessing of polycondensates or polyesters is thus extremely problematic due to the numerous degradation processes that must be observed, and special processes are required. All this makes the recycling of polycondensates, and in particular of polyesters, and especially of PET, very problematic and precarious, such that economic recycling of such plastics has only become possible after special processes were developed.

Of course, this also applies to the production of polycondensates or polyesters with fillers. However, in the case of filled polycondensates, it must be additionally taken into account that large amounts of additional moisture is introduced not only with the polymer itself, but also with the fillers, and this has a negative effect on chain length. For example, calcium carbonate has a very large surface to which large amounts of moisture adhere, namely more than 1000 ppm at 20° C. and 60% humidity.

The reduction of moisture is also an advantage in preventing the formation of acidic or basic degradation products in the first place.

Thus, mechanical means can be used to reduce moisture, such as pre-dryers, vacuum systems or such, and/or appropriately dry initial materials can be used, and/or the dwell time during reprocessing can be extended long enough.

In accordance with a preferred embodiment, chemical dryers, particularly calcium oxide, can also be used to reduce moisture, where the amount used depends on the expected residual moisture, whereby the quantity or throughput of calcium oxide lies in a range between 0.01% and 3% by weight, preferably between 0.1% and 1% by weight of the total mix. Calcium oxide or burnt lime or caustic lime reacts with water while generating much heat. For that reason, and due to its mechanical properties, it is well suited for the removal of moisture.

In this connection, it is particularly advantageous when it is provided that the chemical drying agent is added to the polymer together with the filler, especially that calcium oxide is added to the polymer together with calcium carbonate. In this manner, the reduction of residual moisture can be effectively combined with neutralization. For example, when calcium oxide reacts with residual water, calcium hydroxide is generated, i.e. slaked lime, in the form of a white powder. However, calcium oxide as well as calcium hydroxide are strongly alkaline. In that connection in particular it is there an advantage when calcium oxide is added together with and at the same time as calcium carbonate, since a neutralization effect can result directly in this manner. The same applies to other combinations of drying agents and classical fillers. In this manner, a combination effect of neutralization and drying can be achieved simultaneously.

The required quantities of calcium oxide are very low, which means that due to the lower cost of the product itself, there is no considerable increase in the total reprocessing costs. In any event, the potential damage due to machine corrosion would be costlier than the additives required.

On the one hand, the degradation or decomposition products are formed by the thermal, oxidative and/or petrochemical and radiation-induced degradation of the polymers themselves, e.g. by barrier layer laminates in multi-layer foil such as ethylene vinyl acetate (EVA), ethylene vinyl alcohol (EVOH), polyvinylidene chloride (PVDC), etc. They are also formed by the degradation of the additives or auxiliary substances contained in the polymer to be recycled, in particular adhesives, printer inks, etc.

In particular, the specially corrosive compounds are acidic compounds, namely inorganic acids such as hydrochloric acid or organic acids such as acetic acid.

It is also advantageous when it is provided that after reprocessing, the material is subjected to a compaction step, in particular to melting or extrusion.

Another object of the present invention is the special use of a filler, in particular the process according to one of the claims, to control the pH value or to neutralize acidic and/or basic compounds, especially degradation and decomposition products, in the course of the reprocessing and recycling of plastics, particularly thermoplastics, in the course of which the polymer particles are permanently agitated and heated in a reactor, namely at a quantity that corresponds at least to the anticipated acidic or basic load.

The filler is developed and added in particular according to the characteristics of the inventive process. Thus, all characteristics of the claims pertaining to the process also apply to the use of the filler and represent advantageous further developments of the claim for the special application of a filler. For that reason, those characteristics are not being repeated at this point.

To be able to perform the inventive process in an advantageous manner, an apparatus may be used for example that is provided with a receiving container or reactor or cutter compactor for the plastic material to be processed, to which the plastic material to be treated is fed through an input opening and from which the material is discharged by at least one auger connected to the side wall of the container, whereby in the floor area of the container at least one mixing tool rotating about a vertical axis is provided, and where the intake opening of the auger lies at least approximately at the level of the tool.

The plastic material to be treated is presented in this receiving container or reactor and treated while constantly mixed and agitated and/or comminuted at an increase temperature. For mixing and heating of the plastic material at least one comminuting and mixing tool is provided in the reactor which may be arranged on several levels above each other, which can rotate about a vertical axis, and which has working edges which comminute and/or mix the material. The comminuting and mixing tools apply mechanical energy to the polymer material which heats and simultaneously mixes and agitates the polymer material. Heating is provided by conversion of the applied mechanical energy.

Dosing the filler is usually done in the top third of the reactor. This allows for a sufficient dwell time which can be utilized for the drying and mixing of the filler with the flakes. Dosing is possible above as well as below the uppermost material level. Dosing below the uppermost material level, particularly in the lower third, is preferred.

The inventive process can be performed with various known arrangements: The arrangements exactly and specifically described in patents EP 123 771, EP 390 873, AT 396 900, AT 407 235, AT 407 970, AT 411 682, AT 411, 235, AT 413 965, AT 413 673 or AT 501 154 with all their advantageous embodiments are included in the present disclosure and constitute an integral part of the disclosure. Such arrangements are also employed in practice and are known, for example, as "Erema Kunststoff Recycling System PC" or as " one or two stage Vacurema systems".

For the inventive process it is advantageous when—with appropriate dwell time—the process is performed at an increased temperature and under continuous agitation. Reprocessing is done at a temperature below the melting temperature and preferably above the glass transition temperature of the plastic material, whereby the polymer material is evenly and constantly agitated and mixed. The free-flowing property of the material is constantly maintained. This allows the crystallization, drying and/or cleaning of the plastic material in one step. For a good final product, the mild but steady agitation of the polymer material is advantageous.

This prevents the lumping or sticking of the material in the critical temperature range until the adequate crystallization of the particle surfaces itself prevents the individual particles from sticking together. Furthermore, this agitation makes a higher process temperature possible. In the treatment container, the mild and steady agitation as well as the prevention of sticking ensures that the temperature in the container is or remains sufficiently high and that each particle is carefully heated to or maintained at the appropriate temperature At the same time, agitation supports the separation of migrating molecules from the surface of the particles.

The exact parameters depend on the polymer material to be treated: The temperature ranges between about 70° C. and 240° C.; the peripheral speed of the mixing tool is in the range between about 2 to 35 m/s. If need be, i.e. for sensitive polymers such as PET, a vacuum of about $\leqq 150$ mbar can be established. The material and the filler remain in the reactor for a mean dwell time of about 10 to 200 min before they are compacted. However, these values are only approximate.

Below, the process is described by means of two exemplary advantageous embodiments:

EXAMPLE 1

Waste plastic foil[1] with about 25% of its surface printed, at a throughput of 400 kg/h is loaded into a cutter compactor. In its interior is a mixing and comminuting tool running at 650 rpm. The mixing and agitating tools comminute the material and simultaneously ensure that the material is heated through friction, namely to a temperature above the glass transition temperature but below the melting temperature, i.e. in the range just above the Vicat softening temperature of 85° C. This causes a mixing spout in the cutter compactor. Through the constant movement, the lumping of the material is prevented, and the polymer flakes remain constantly chunky and freely flowing. The flakes go through the cutter with a mean dwell time of 8-15 min.

In the lower region of the cutter compactor an extruder is connected. The mixing tools convey the softened material into the intake area of the extruder.

Furthermore, a powder dosing unit is provided in the cutter compactor, and per hour 4 kg of calcium carbonate are added, namely into a lower region of the container in which the material is already in a softened state. Alternatively the filler can also be loaded from the top. In this manner, the filler is thoroughly and homogenously mixed, and the mix is then melted in the extruder and degassed, filtered and granulated as required.

EXAMPLE 2

In principle, this embodiment works the same as that of Example 2, but with the following differences:

Waste foil of propylene with about 60 to 80% of its surface printed, at a throughput of 350 kg/h is loaded into a cutter compactor in whose interior a mixing and comminuting tool is rotating at 650 rpm. The mixing and agitating tools comminute the material and simultaneously ensure that the material is heated through friction, namely to a temperature above the glass transition temperature but below the melting temperature, i.e. in the range just above the Vicat softening temperature of 145° C. The polymer flakes

[1] Translator's note: Alternative translation for Folie: plastic wrap. always remain freely flowing. The flakes go though the cutter compactor at a mean dwell time of 8-15 min.

In the lower region of the cutter compactor an extruder is connected. The mixing tools convey the softened material into the intake area of the extruder.

Furthermore, a powder dosing unit is provided in the cutter compactor, and per hour 5-6 kg of calcium carbonate are added, namely into a lower region of the container in which the material is already in a softened state. Alternatively the filler can also be loaded from the top.

Furthermore, 2.8 kg/h, i.e. approximately 0.8% by weight of calcium oxide (CaO) is added via the powder dosing unit.

In this manner, the calcium carbonate and the calcium oxide are thoroughly and homogenously mixed, and the mix is then melted in the extruder and degassed, filtered and granulated as required.

In these tow versions of the process, which represent scenarios that are common in everyday recycling, it has been shown that the machine parts are far less damaged and corroded.

The invention claimed is:

1. Process for adjusting the pH value and/or for neutralizing acidic and/or basic compounds, in particular degradation or decomposition products, as part of the reprocessing and recycling, in particular of thermoplastic materials, where in a first step the polymer material to be recycled is presented on a cutter compactor equipped with a mixing and comminuting arrangement, and where subsequently the polymer particles are permanently agitated and heated, characterized in that to neutralize the resulting degradation and decomposition products, in particular organic dyes from printed surfaces, at least one filler in powder form is added to the softened but not yet melted polymer, namely at a quantity that corresponds at least to the anticipated acidic and basic load, whereby for a certain dwell time, the mixture is permanently mixed, agitated, comminuted if appropriate, held in chunky and free-flowing form.

2. Process according to claim 1, characterized in that the filler used is a solid, powdery, in particular mineral substance which is customarily used as an extender or extending means, such as chalk, kieselguhr, zinc oxide, saw dust, starch, graphite, soot, talcum, activated carbon and preferably a carbonate, in particular calcium carbonate.

3. Process according to claim 1, characterized in that the filler used is a filler of medium grain size and/or a $D_{50}$ value of less than 50 μm particularly between 2 and 15 μm, and/or with a specific surface of 2 to 11 $m^2/g$, in particular 5 to 9 $m^2/g$.

4. Process according to claim 1, characterized in that the filler has not been surface-treated and is without any coating such as stearic acid.

5. Process according to claim 1, characterized in that the quantity of the added fillers is about 0.1% to 15% by weight, preferably between 1% and 10% by weight, whereby % by weight refers to the total weight of the polymer and filler mix.

6. Process according to claim 1, characterized in that treatment is performed in an evacuable cutter compactor under vacuum conditions of ≦150 mbar.

7. Process according to claim 1, characterized in that at least some, preferably all of the filler is added to the polymer that has been heated to a temperature of more than 30° C. below its Vicat softening point (10 N), but still below its melting point.

8. Process according to claim 1, characterized in that with polymers, especially those which are particularly sensitive to hydrolytic degradation or which may be hygroscopic, such as polyesters and especially with PET, means to reduce residual moisture are applied in the mixture.

9. Process according to claim 1, characterized in that mechanical means are applied to reduce moisture, such as predryers, vacuum systems, etc. and/or that appropriately dry initial materials are used and/or the dwell time during reprocessing can be extended long enough.

10. Process according to claim 1, characterized in that the means applied to reduce moisture consists of chemical dryers, particularly calcium oxide, where the amount used depends on the expected residual moisture, whereby the quantity of calcium oxide lies in a range between 0.01% and 3% by weight of the total mix.

11. Process according to claim 1, characterized in that the chemical dryer is added to the polymer together with the filler, especially that calcium oxide is added to the polymer together with calcium carbonate.

12. Process according to claim 1, characterized in that the degradation or decomposition products are formed by the thermal, oxidative and/or petrochemical and/or radiation-induced degradation of the polymers, e.g. by barrier layer laminates in multi-layer foil such as ethylene vinyl acetate (EVA), ethylene vinyl alcohol (EVOH), polyvinylidene chloride (PVDC), etc., and/or that they are formed by the additives or auxiliary substances contained in the polymer to be recycled, in particular by adhesives, printer inks, etc.

13. Process according to claim 1, characterized in that the compounds to be neutralized are inorganic acids such as hydrochloric acid or nitric acid, or organic acids such as acetic acid.

14. Process according to claim 1, characterized in that after reprocessing, the material is subjected to a compaction step, in particular to melting or extrusion.

* * * * *

UNITED STATES PATENT AND TRADEMARK OFFICE
CERTIFICATE OF CORRECTION

PATENT NO. : 8,334,326 B2
APPLICATION NO. : 13/260966
DATED : December 18, 2012
INVENTOR(S) : Klaus Feichtinger, Manfred Hackl and Gerhard Wendelin Page 1 of 1

It is certified that error appears in the above-identified patent and that said Letters Patent is hereby corrected as shown below:

On the Title Page Item (75) Inventors: Line 3: please replace "CH" with --AT--

It should read: Gerhard Wendelin, Linz (AT)

Signed and Sealed this
Nineteenth Day of March, 2013

Teresa Stanek Rea
*Acting Director of the United States Patent and Trademark Office*